Patented Oct. 15, 1940

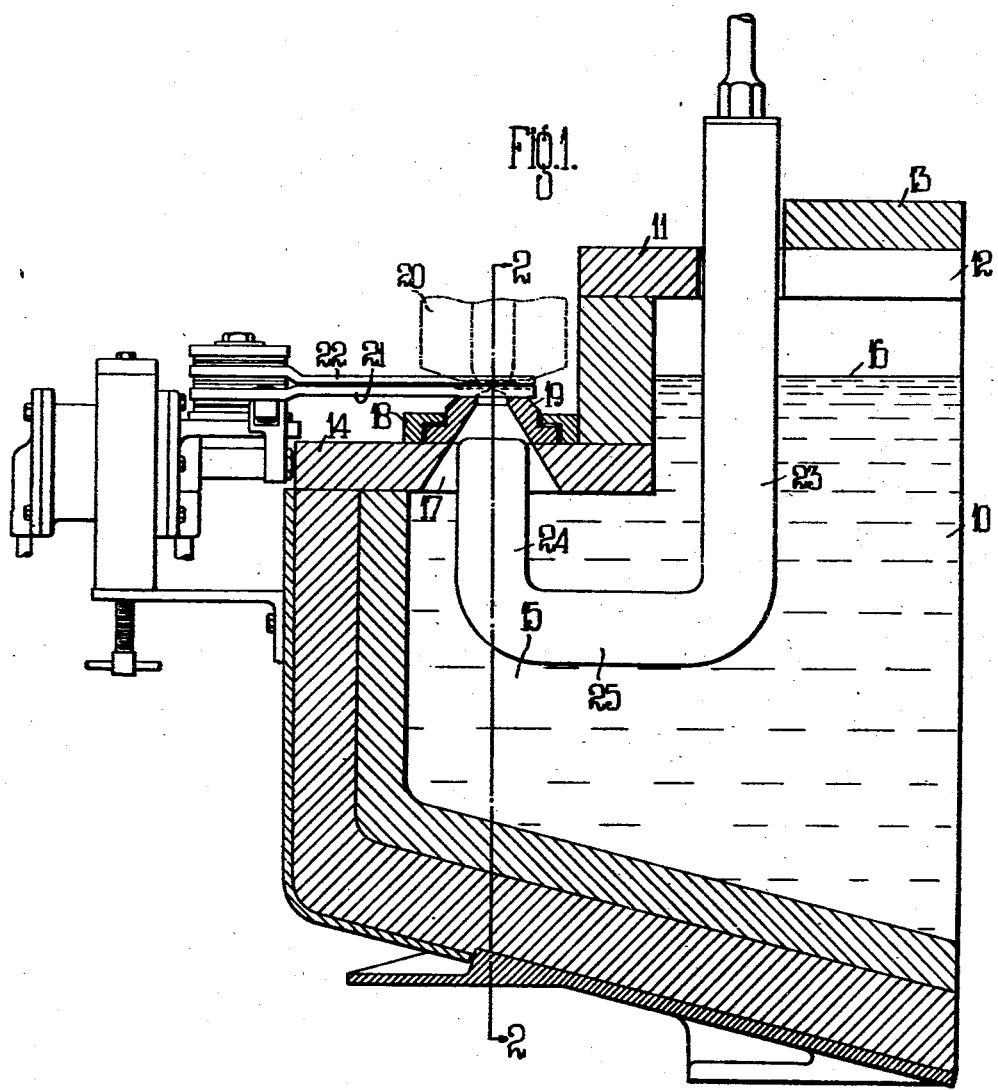

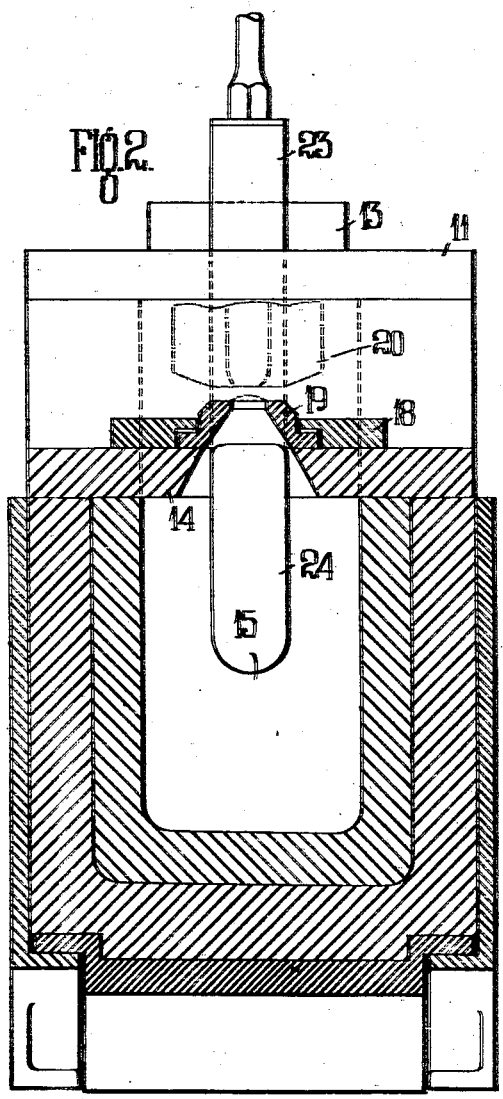

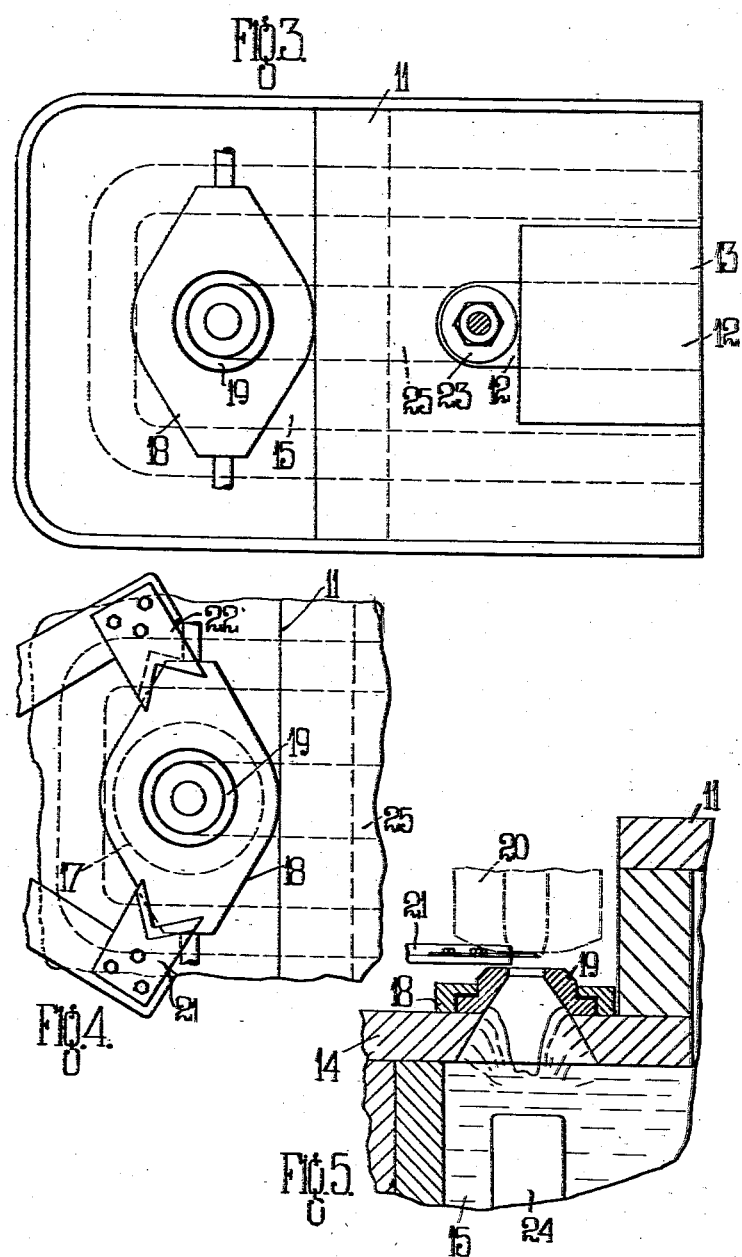

2,217,811

UNITED STATES PATENT OFFICE 2,217,811

MANUFACTURE OF BOTTLES OR OTHER HOLLOW ARTICLES OF GLASSWARE

Thomas Finney Pearson and Ralph Riley Prest, Pontefract, England, assignors to Crown Cork & Seal Company, Inc., New York, N. Y., a corporation of New York Application June 29, 1937, Serial No. 151,010
In Great Britain July 8, 1936

10 Claims. (Cl. 49—56)

The present invention relates to the manufacture of bottles or other hollow articles of glassware.

The object of the present invention is to provide an efficient yet simple method of, and apparatus for, controlling the flow of glass from the gathering area of a forehearth of a furnace to suction moulds within which the glass may be shaped or by which charges of glass may be delivered to a forming machine.

Broadly the present invention includes the method of causing glass to flow in an upward direction towards an outlet orifice by the action of the static head of glass within the forehearth and controlling said flow by means of a plunger displacement.

Further by the present invention the flow of glass in an upward direction through an outlet orifice of a furnace, preferably in the roof of a forehearth thereof, which outlet is below the level of the glass in the furnace or forehearth, is controlled by a reciprocating plunger, so as to present masses of glass at predetermined intervals of time at the outlet orifice to suction moulds for delivery to a bottle or the like forming machine.

By virtue of the fact that the outlet orifice is below the level of the glass in the furnace or forehearth a pressure head is always available to cause a flow of glass outwardly through the orifice under the control of the reciprocating plunger.

The invention is more particularly described with reference to the accompanying drawings, in which—

Figure 1 is a longitudinal sectional elevation through a forehearth of a furnace with the gathering area at the front of the forehearth.

Figure 2 is a sectional elevation on the line 2—2 of Figure 1.

Figure 3 is a corresponding plan view with the shears removed.

Figure 4 is a plan view of part of the forehearth showing the shears in their open position relatively to the exit orifice.

Figure 5 is a detail in sectional elevation showing the manner in which the sheared glass on withdrawal of the plunger is buried within the mass of glass so as to present a fresh surface to the outlet orifice on the next upward stroke of the plunger.

In the drawings the forehearth 10 of the furnace has a refractory roof 11 which is slotted at 12, the major portion of the slot 12 being covered by a refractory plate 13. A refractory roof 14 is provided above the gathering area 15 of the forehearth, said roof 14 lying below the normal level 16 of glass within the forehearth.

An orifice 17 of truncated conical form is formed in the roof 14 which supports a holder 18 for a removable annular bush 19, the inner face of which is also conical and when the bushing is mounted in position said inner face constitutes an extension of the conical wall of the orifice 17.

The bushing 19, therefore, in effect constitutes the outlet orifice for glass from the gathering area and by replacing the bushing with one of a different size, it is possible to vary the area of said outlet orifice.

A suction mould 20 of any desired form, such as, for example the type described in patent application Serial No. 16,920, is adapted for displacement into and out of a position above the outlet orifice of the gathering area, whilst between the outlet orifice and the suction mould 20, when the latter lies co-axial with the orifice, is a pair of shears the blades 21, 22 of which are reciprocable in a horizontal plane to cut off each charge of glass from the mass of glass as it passes through the outlet.

A plunger is provided to control the glass passing through the outlet orifice, said plunger consisting of a pair of vertically disposed limbs 23, 24, interconnected by a web 25. The plunger is reciprocated vertically by any desired known means, which are not shown but which lie externally of the forehearth, and for this purpose the limb 23 passes through the slot 12 in the roof 11. If it is desired to remove the plunger 23, 24, 25, from the furnace the plate 13 is removed and the plunger as a body withdrawn through the slot 12.

The plunger is reciprocated in synchronism with the displacement of the shear blades, the action being such that the shear blades 21, 22, are brought together to effect the shearing operation when the upper end of the limb 24 closes or substantially closes the outlet orifice of the gathering area, the shear blades being withdrawn in opposite directions on descent of the plunger away from said orifice.

In operation, when the plunger is at the lowest end of its stroke and the upper end of the limb 24 away from the outlet orifice, glass is allowed to flow into the removable bush 19 under the action of the static head of pressure of the glass within the forehearth whereupon a charge of molten glass is picked up by the mould 20 which, when the limb 24 of the plunger lies away from the orifice, is in the position shown in the drawings. For this purpose the displacement of the suction mould 20 is also effected in synchronism with the plunger, so as to lie in the position shown during the ascent of the plunger and to be displaced away from the orifice on descent of the plunger.

During charging of the mould 20 the plunger rises until the upper end of the limb 24 reaches a position in which it is able to stop the overflow of glass through the bushing 19, that is to say, it throttles the outlet and acts as a valve.

At the termination of the upward stroke of the plunger where it substantially closes the outlet, the shears are operated to sever the gather and thus allow the suction mould to be displaced with a gather therein. The plunger then recedes in a downward direction and as shown in Figure 5, takes with it the chilled glass which has been deposited on the upper end of the plunger by the action of the shears in severing the charge and buries this chilled deposit within the molten glass where it is reheated and again made workable for eventual use on subsequent reciprocations of the plunger.

It will be appreciated that the web portion of the plunger 25 acts as a circulator for the glass in the forehearth on reciprocation of the plunger and thus prevents one portion of the glass remaining at a lower temperature than the mass of the glass in general.

If desired, more than one outlet orifice may be provided in which event a separate plunger may be associated with each orifice or again a number of outlet orifices may be controlled by a plunger common to all, said common plunger consisting of a limb similar to the limb 23 and a number of limbs 24 each co-axial with a single orifice and united to the common limb by web portions.

It will be appreciated that the speed of reciprocation of the plunger, its length of stroke, its limiting positions at the end of the stroke and the diameter of the outlet orifice may be varied to suit conditions of working. Thus, when it is desired to increase the weight or size of each charge of glass picked up by the suction mould from the outlet orifice of the forehearth or furnace, the said outlet orifice is varied in size by means of renewable bushings adapted for detachable connection to the outlet orifice. Again, an increase in the number of gathers over a given length of time is obtained by increasing the speed of reciprocation of the plunger, this variation in speed of reciprocation together with variation in the length of the stroke of the limiting positions of reciprocation of the plunger also enabling glass of different viscosity to be used and allowing a variable volume in each charge of glass as it is presented to the outlet orifice.

Again, by varying the limiting positions and the length of the plunger stroke the cut face of the charge of glass after the shears have been operated is buried within the main mass on retreat of the plunger by a variable amount so that there is no danger of presentation of this cut face when a succeeding charge is to be picked up before the glass has had an opportunity of being re-heated.

It will thus be seen that the level or head of glass in the furnace or forehearth, that is to say, its height above the outlet orifice controls the speed of flow of the glass through the orifice whilst the limiting positions and the length of the plunger stroke together with the speed of the plunger in turn controls the head of glass and prevents overflowing.

We declare that what we claim is:

1. Apparatus for feeding molten glass to moulds comprising a furnace forehearth having a forwardly disposed gathering area, a roof for said area disposed at a level below the normal glass level in the forehearth, said roof having an orifice therein through which molten glass from the gathering area is delivered upwardly by the static head of the glass within the forehearth, a vertically reciprocable plunger located within said forehearth with a part of the plunger below and axially aligned with said orifice for controlling the flow of glass through said outlet orifice and shears located externally of said forehearth and immediately above said orifice to cut the glass passing through said orifice into gathers for reception by a mould.

2. In combination, a forehearth having a forwardly disposed gathering area, a roof part for said gathering area below the normal level of glass in said forehearth, the part having an upwardly facing outlet orifice for glass therein adapted to deliver glass upwardly to a position to be gathered by, a suction mould and a plunger reciprocable within the glass in said gathering area below and aligned with said opening.

3. In combination, a forehearth including a forwardly disposed gathering area, a roof part for said gathering area below the normal level of glass in said forehearth and having an outlet orifice to which glass in said gathering area is delivered by the static head of glass in said forehearth, and a plunger reciprocable within the glass in said gathering area, said plunger having an upwardly facing end surface below and aligned with said orifice and being adapted to deliver masses of glass at predetermined intervals of time to and through said outlet orifice.

4. In combination, a forehearth including a forwardly disposed gathering area, a roof part for said gathering area below the normal level of glass in said forehearth and having an outlet orifice through which glass in said gathering area is delivered by the static head of glass in said forehearth, a vertically reciprocable plunger formed of two parallel limbs interconnected by a web, one of said limbs being co-axial with and below said outlet orifice within the glass of the gathering area and means for reciprocating said plunger, to deliver masses of glass at predetermined intervals of time to and through said outlet orifice.

5. In combination, a forehearth having a forwardly disposed gathering area, a roof part for said gathering area below the normal level of glass in said forehearth and having an outlet orifice through which glass from said gathering area is delivered by the static head of glass in said forehearth, a valve reciprocable within the glass in said gathering area coaxially aligned with said orifice for closing said orifice at predetermined intervals to cut off the supply of glass delivered to the discharge position of pick up by said mould.

6. In combination, a forehearth having a forwardly disposed gathering area, a roof part for said gathering area below the normal level of glass in said forehearth and having an upwardly facing outlet orifice for glass therein, a plunger reciprocable within the glass in said gathering area below, and in a direction axially of, said orifice for delivering masses of glass at predetermined intervals of time through said outlet orifice, and shear means above said orifice adapted to shear charges fed upwardly therethrough.

7. A method of feeding molten glass to moulds which comprises delivering glass upwardly through an orifice in the roof of a gathering area of a furnace forehearth by the action of the static head of the glass within the forehearth, substantially closing said orifice by an implement positioned below the orifice, shearing into gather form the glass which has passed therethrough, reopening said orifice, and positively retracting the sheared face of the mass of glass in the gathering area, thereby to bury the same within said mass before a fresh charge is delivered to said orifice for shearing.

8. Apparatus for feeding molten glass to moulds comprising a furnace forehearth having a roof part below the normal glass level in the forehearth, said part being provided with an orifice to which molten glass is delivered upwardly by the static head of the glass within the forehearth, a plunger comprising parallel vertical limbs and an intermediate web which is located within said forehearth below said orifice, one of said limbs being coaxially aligned with and having an end face positioned below said orifice, said plunger being mounted for reciprocation vertically with respect to said outlet orifice, thereby to control the masses of glass delivered therethrough, said web acting as a circulator for glass in said forehearth.

9. Apparatus for delivering moulten glass to moulds comprising a furnace forehearth having an upwardly facing discharge orifice positioned with its upper margins at a level below the normal glass level in the forehearth, whereby moulten glass is delivered upwardly through said orifice by the static head of the glass within the forehearth, and a reciprocating plunger having an end face located within said forehearth below said orifice and in axial alignment therewith, said plunger being mounted for movement toward and from the orifice for controlling the upward flow of glass therethrough under the influence of said static head.

10. Apparatus for delivering moulten glass to moulds comprising a furnace forehearth having an upwardly facing delivery orifice positioned to receive glass by a gravity flow from the forehearth, a plunger in the forehearth having an end face submerged in the glass and disposed below and axially aligned with the orifice, said end face being imperforate and being of a diameter larger than the diameter of the discharge orifice, said plunger being mounted for reciprocation to move said end face toward and from the orifice to control the delivery of glass therethrough.

THOMAS FINNEY PEARSON.
RALPH RILEY PREST.